(12) United States Patent
Hilberer (10) Patent No.: US 8,543,304 B2
(45) Date of Patent: Sep. 24, 2013

(54) CLUTCH RELEASE SYSTEM AND METHOD FOR OPERATING A CLUTCH RELEASE SYSTEM

(75) Inventor: Eduard Hilberer, Hockenheim (DE)

(73) Assignee: Knorr-Bremse Systeme fuer Nutzfahrzeuge GmbH, Munich (DE)

( * ) Notice: Subject to any disclaimer, the term of this patent is extended or adjusted under 35 U.S.C. 154(b) by 122 days.

(21) Appl. No.: 13/017,396

(22) Filed: Jan. 31, 2011
(Under 37 CFR 1.47)

(65) Prior Publication Data

US 2012/0010795 A1  Jan. 12, 2012

Related U.S. Application Data (63) Continuation of application No. PCT/EP2009/005562, filed on Jul. 31, 2009.

(30) Foreign Application Priority Data

Aug. 1, 2008  (DE) .......................... 10 2008 036 038

(51) Int. Cl.
 F16D 13/54 (2006.01)
 F16D 25/12 (2006.01)
 F16D 13/75 (2006.01)

(52) U.S. Cl.
 USPC .............. 701/68; 192/70.252; 192/85.62; 192/111.1; 192/111.12

(58) Field of Classification Search
 USPC ............. 701/68; 192/3.54, 30 W, 31, 70.252, 192/85.62, 111.1, 111.12, 111.14
 See application file for complete search history.

(56) References Cited

U.S. PATENT DOCUMENTS

| 6,276,197 | B1 * | 8/2001 | Hayashi et al. ............ 73/115.04 |
| 7,407,463 | B2 * | 8/2008 | Kinder .......................... 477/170 |
| 2007/0209898 | A1 * | 9/2007 | Reuschel ...................... 192/54.4 |
| 2008/0215219 | A1 * | 9/2008 | Porzel et al. .................... 701/68 |
| 2009/0101464 | A1 | 4/2009 | Doebele et al. |
| 2010/0179738 | A1 | 7/2010 | Desfriches et al. |

FOREIGN PATENT DOCUMENTS

| DE | 10 2004 015 185 A1 | 10/2005 |
| DE | 10 2006 014 141 A1 | 10/2007 |
| DE | 102006037958 A1 * | 2/2008 |
| DE | 10 2006 037 958 A1 | 5/2008 |

(Continued)

OTHER PUBLICATIONS

German Office Action dated May 29, 2009 including English translation (Eight (8) pages).

(Continued)

Primary Examiner — Khoi Tran
Assistant Examiner — Robert Nguyen
(74) Attorney, Agent, or Firm — Crowell & Moring LLP (57) ABSTRACT

A method operates a clutch release system of a vehicle having an electrically actuable clutch release unit including a sensor for detecting a position of a release piston, a control unit for controlling the release piston as a function of a detected position of a clutch actuating device, and a sensor for detecting the position of the clutch actuating device. A characteristic curve function describes a relationship between the position of the clutch actuating device and the position of the release piston. The function is taken into consideration during actuation of the clutch release system to obtain a consistent clutch release at a defined position of the clutch actuating device despite progressive wear of the clutch release system.

9 Claims, 4 Drawing Sheets (56) References Cited

FOREIGN PATENT DOCUMENTS

| DE | 10 2006 054 021 A1 | | 5/2008 |
|----|--------------------|---|--------|
| DE | 102006054021 A1 | * | 5/2008 |
| EP | 1 679 450 A2 | | 7/2006 |
| FR | 2 918 334 A1 | | 1/2009 |
| FR | 2 922 616 A1 | | 4/2009 |
| FR | 2922616 A1 | * | 4/2009 |

OTHER PUBLICATIONS

International Search Report dated Nov. 25, 2009 including English translation (Six (6) pages).

* cited by examiner

CLUTCH RELEASE SYSTEM AND METHOD FOR OPERATING A CLUTCH RELEASE SYSTEM

CROSS REFERENCE TO RELATED APPLICATIONS

This application is a continuation of PCT International Application No. PCT/EP2009/005562, filed Jul. 31, 2009, which claims priority under 35 U.S.C. §119 from German Patent Application No. DE 10 2008 036 038.4, filed Aug. 1, 2008, the entire disclosures of which are herein expressly incorporated by reference.

BACKGROUND AND SUMMARY OF THE INVENTION

The invention relates to a method for operating a clutch release system of a vehicle with an electrically actuable clutch release mechanism, which includes a sensor for detecting a position of a release plunger of the clutch release mechanism and a control device, which controls a release plunger as a function of a detected position of a clutch actuation device. A further sensor detects the position of the clutch actuation device.

The invention furthermore relates to a clutch release system with an electrically actuable clutch release mechanism, which includes a sensor for detecting a position of a release plunger of the clutch release mechanism and a control device, which controls a release plunger as a function of a detected position of a clutch actuation device. A further sensor detects a position of a clutch actuation device.

A drivetrain of a vehicle usually has a clutch which is suitable for interrupting the drivetrain of the vehicle. The interruption of the drivetrain is required, for example, in the event of a gear change in a transmission arranged in the drivetrain.

Ordinarily, the clutch includes a clutch actuator, which in turn normally has a power part and a control part. The power part performs the task of providing the releasing force using a pressurized medium, for example compressed air from a tank. The power part includes a release plunger and a valve control mechanism, which may be in the form of a solenoid valve control mechanism, for example.

During the actuation of the clutch, a clutch disk between a pressure plate and a flywheel is lifted, whereby a transmission of torque from the flywheel to a driver disk, which is connected in a manner fixed against rotation to the pressure plate, is interrupted. The release bearing driven during the lifting process is in this case caused to disengage by performing a pushing movement, in the case of a pushing design of the clutch, and a pulling movement, in the case of a pulling design of the clutch, in order to eliminate the contact-pressure forces which are usually generated by plate springs and to open the clutch. In the case of an eccentric arrangement of the clutch release mechanism, it is possible to realize force transmission from the clutch release mechanism or clutch actuator to the release bearing via a lever.

The control part of the clutch release mechanism includes a clutch transducer, which measures a pedal travel, wherein the measured travel is predetermined proportionally, as a hydraulic or electrical variable, to the intensifying power part, for example a cylinder, as a setpoint variable. This setpoint variable can then still be corrected, in particular in the case of an electrical signal transmission. In the case of a hydraulic control circuit of the clutch, leak compensation is possible by virtue of a valve-controlled continuing flow of oil from a tank.

Electrically controlled clutch actuators or clutch release mechanisms are predominantly driven by transmission electronics of an automatic transmission, wherein electrical clutch actuators have the advantage that the control circuit does not need to be deaerated and is not sensitive to leaks. Furthermore, there are motor-driven actuators, but these are not sufficiently robust for commercial vehicle applications and cannot perform shifting operations at high power or quickly enough.

Conventionally, a clutch which is used has at least one wearing part, for example a clutch disk or a clutch lining, which is worn away when the clutch is shifted. In this case, the material thickness of the wearing part decreases continuously, for which reason the shift point of the clutch, i.e. the point at which the wearing part enables a first force transmission via the clutch, is moved.

In order to release the clutch, there are hydraulic control circuits, but these do not have the option of wear adaptation and also do not enable any software-based learning of a characteristic for the clutch release.

In order to solve this problem, it is known to design the clutch to be self-adjustable with the aid of an elastic element, for example a spring, which prestresses the clutch disk. The wear adaptation then takes place automatically via the prestressed mechanism.

Furthermore, there are fully electronic transmission shift mechanisms which can also have integrated control circuits for clutch release and have a very complex design. The installation space available for an electrical control circuit in the vicinity of the drivetrain is subjected to a high temperature of approximately 110° C., for which reason more stringent requirements need to be placed on all of the constructed electronics in this region. A clutch release mechanism for such a transmission shift mechanism which has self-adjusting wear adaptation is known from DE 10 2006 037 958 A1, for example.

The invention is based on the object of providing a method for operating a clutch release system, with the aid of which the design of the operated clutch system can be simplified while retaining the same functionality.

In accordance with the invention, a characteristic function F, which describes a relationship between the position of the clutch actuation device and the position of the release plunger, is taken into consideration during the actuation of the clutch release system in order to achieve constant clutch release, despite progressive wear on the clutch release system, in the case of a defined position of the clutch actuation device. By matching the clutch release system to the progressive wear, the outwardly visible properties of the clutch release system can be kept constant over the life of the wearing parts used and the operational convenience can be increased. At the same time, the wear adaptation ensures operation of the clutch release system which is gentle on the materials since longer-lasting abrasion of the wearing part can be avoided. No additional mechanism is required for the adaptation itself since the adaptation takes place with the aid of the characteristic function F.

It is particularly preferred that the characteristic function F is stored in a random-access memory arranged in the clutch release system.

Provision is preferably made for, during the actuation of the clutch release system, an updated characteristic function $F_{act}$ to be determined by the control device. The updated characteristic function $F_{act}$ describes an actual relationship between the position of the clutch actuation device and the position of the release plunger. The stored characteristic function F is replaced by the updated characteristic function $F_{act}$ after the actuation of the clutch release system in order to provide an actual characteristic function F during the next actuation of the clutch release system. In this way, continuous wear adaptation of the clutch release system with each shifting operation is achieved.

In particular, provision can be made for the clutch slip during the actuation of the clutch release system to be taken into consideration for determining the updated characteristic function $F_{act}$ via a connection to a CAN bus.

Usefully, provision can be made for a warning signal to be output if a permissible wear value stored in an electrical random-access memory is exceeded by a determined wear value. In this case, for example, the stored characteristic function F indicates that a permitted wear on a wearing part has been exceeded by a large no-load excursion $L_1'$. The no-load excursion of the clutch release system increases in size as the wear on the wearing part increases, since the material thickness of the wearing part decreases. If the material of the wearing part has largely been eroded away, this can be detected by a measurement of the no-load excursion of the clutch release system, for example by virtue of a comparison with the original no-load excursion of the clutch release system $L_1$ with an unused wearing part. The output of a warning signal in the event of a permitted wear on a wearing part, for example a clutch disk, being exceeded serves to safeguard the operational readiness of the vehicle since a surprising failure of the clutch release system owing to a completely worn clutch disk can be avoided.

Furthermore, provision can be made for the vehicle to be taken out of operation if the stored characteristic function F indicates that a permissible wear on a wearing part has been exceeded by a large no-load excursion $L_1'$. Taking the vehicle out of operation serves to protect sensitive vehicle components which could be damaged in the case of complete wear of a wearing part, for example a clutch disk. The permissible wear, i.e. the thickness of the material eroded away by friction, is in this case determined by a minimum stability, required for safety reasons, of the clutch disk. This minimum stability represents the limit below which it is no longer possible to rule out a rupture.

Provision can also be made for the stored characteristic function F to be stored in the random-access memory in the factory prior to the first actuation of the clutch release system.

Alternatively, provision can be made for the stored characteristic function F to be determined during the first actuation of the clutch release system and to be stored in the random-access memory. The determination of the characteristic function F during the first actuation of the clutch release system enables simple manufacture of the clutch release mechanism with comparatively large tolerances and automatic adaptation of the clutch release mechanism to various clutch actuation devices, since any deviations from a desired response can be compensated for via the characteristic function F.

The clutch release system is developed by virtue of the fact that the control device is suitable for taking into consideration a characteristic function F, which describes a relationship between the position of the clutch actuation device and the position of the release plunger, during the actuation of the clutch release system in order to achieve constant clutch release, despite a progressive wear on the clutch release system, in the case of a defined position of the clutch actuation device.

In this way, the advantages and special features of the method according to the invention are also used in the context of a clutch release system. This also applies to the particularly preferred embodiments of the clutch release system according to the invention specified below.

This clutch release system is usefully developed such that the control device is suitable for determining, during the actuation of the clutch release system, an updated characteristic function $F_{act}$, which describes an actual relationship between the position of the clutch actuation device and the position of the release plunger, and that the control device is suitable for replacing the stored characteristic function F by the updated characteristic function $F_{act}$ after the actuation of the clutch release system in order to provide an actual characteristic function F during the next actuation of the clutch release system.

Furthermore, provision can be made for the clutch release system to include a connection to a CAN bus. The connection to the CAN bus can be used for compensation with external vehicle parameters, for example a motor speed and a transmission speed, wherein the instantaneous clutch slip can be determined from the two mentioned vehicle parameters together with the actual transmission ratio.

Provision can be made for the control device to be suitable for outputting a warning signal if the stored characteristic function F indicates that a permitted wear on a wearing part has been exceeded by a large no-load excursion $L_1'$.

Furthermore, provision can be made for the control device to be suitable for bringing the vehicle out of operation if the stored characteristic function F indicates that a permissible wear on a wearing part has been exceeded by a large no-load excursion $L_1'$.

Preferably, provision can be made for the control device to be suitable for determining the characteristic function F during the first actuation of the clutch release system and storing said characteristic function in the random-access memory.

An electrically actuable clutch release mechanism can be developed by virtue of the fact that a control device for driving the valve device is arranged in the housing of the clutch release mechanism. The arrangement of the control device in the housing of the clutch release mechanism enables a modular design of the clutch release mechanism, with it merely being necessary to provide a media supply connection and a media discharge line for supplying the release plunger which moves the clutch release mechanism and a connection for detecting a clutch actuation desire. This has the advantage that even relatively small, relatively light vehicles which use primarily mechanical transmissions and clutches can make use of the advantages of an electrical clutch release mechanism, with no further changes to the vehicle being necessary. Furthermore, the clutch system can be configured with a learning capacity by virtue of the integrated control device.

Preferably, provision is made for the valve device to be coupled to a connection in order to be supplied with compressed air. The supply of compressed air to the clutch system as the shifting medium avoids damage to the friction lining of the clutch caused by a hydraulic fluid.

Usefully, provision can be made for a sensor for detecting a position of the release plunger of the clutch release mechanism with respect to the fixed housing to be arranged in the housing. By virtue of the detection of the position of the release plunger with respect to the fixed housing, it is possible for the clutch release mechanism itself to detect faulty operation of the clutch release mechanism.

Provision can be made for the valve device to include a 3/2-port directional control valve. The use of a 3/2-port directional control valve, which can be in the form of a solenoid valve, for example, makes it possible for the switching positions of the valve device which are necessary for operating the clutch release mechanism to be realized with the aid of a single valve. In this case, a first connection is coupled to a media supply, a second connection is coupled to a media discharge line and a third connection is coupled to a control area of the release plunger.

In this case, provision is preferably made for the valve device in the connecting line between the 3/2-port directional control valve and the control area to include a 2/2-port directional control valve in the form of a pressure maintenance valve. The pressure maintenance valve can be used to extend the life of the 3/2-port directional control valve driven in pulse-width-modulated fashion since no further switching operations are required during the pressure maintenance.

Alternatively, provision can be made for the valve device to include two 2/2-port directional control valves. The use of two 2/2-port directional control valves, which can be in the form of solenoid valves, for example, likewise makes it possible to realize all of the switching states of the valve device which are required for the clutch release mechanism, with it being possible for the 2/2-port directional control valves to be more robust than a single 3/2-port directional control valve.

Provision can be made for the control device to have a connection to a serial vehicle bus in order to output at least one signal for the clutch wear. A replacement of the clutch linings prior to failure of the clutch system is enabled via the signal for the clutch wear.

Furthermore, it is possible for the valve device to include a common media discharge line. A common media discharge line saves on installation space in the housing. The common media discharge line can in particular be in the form of a simple deaeration bore if compressed air is used as the medium.

Advantageously, provision can be made for a random-access memory to be arranged in the housing of the clutch release mechanism. The random-access memory is provided for storing a characteristic function F and an updated characteristic function $F_{act}$. In this case, the storage can also take place in the form of sets of parameters, from which a characteristic function can be determined or which are suitable for replacing the function of the characteristic function. By virtue of the arrangement of a random-access memory in the housing of the clutch release mechanism, it is possible to perform automatic wear adaptation of the clutch release mechanism in the case of progressive wear on the clutch.

Preferably, provision is made for a plug for electrical connections to be arranged on the housing. A plug provides a simple possible way of providing a standardized connection, as a result of which the integration of various clutch release mechanisms in one vehicle or one clutch release mechanism in various vehicles is facilitated.

Other objects, advantages and novel features of the present invention will become apparent from the following detailed description of one or more preferred embodiments when considered in conjunction with the accompanying drawings.

DETAILED DESCRIPTION OF THE DRAWINGS

Identical or similar parts are denoted by the same reference symbols in the following drawings.

Figure 1:
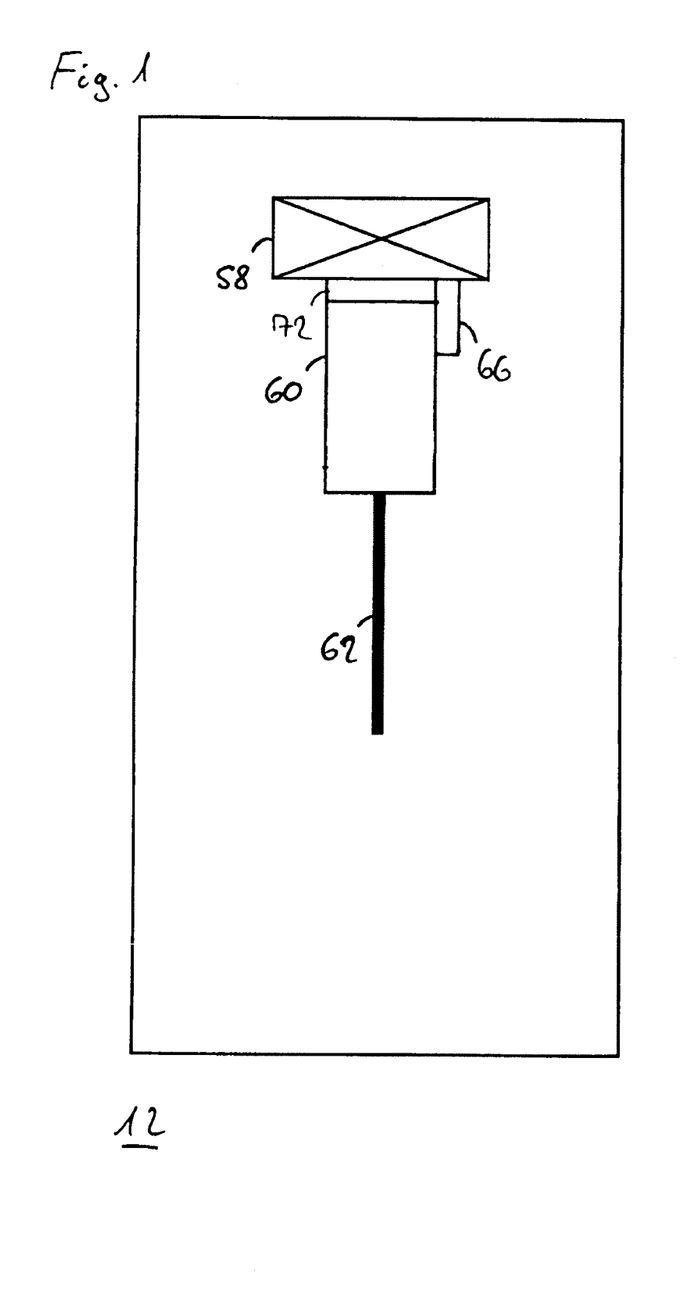
FIG. 1 is a schematic illustration of a vehicle.

FIG. 1 is a schematic illustration of a vehicle. A vehicle 12 as illustrated includes a drive motor 58 on which a transmission 60, a clutch 72 and a housing 66 with a clutch release mechanism are arranged. A drive shaft 62 emerges from the component parts, with drive energy for driving the vehicle 12 being transmitted from the drive motor 58 to driving wheels (not illustrated) via the drive shaft 62. Furthermore, a speed sensor (not illustrated) for determining the crankshaft speed is arranged on the drive motor 58, and a further speed sensor (not illustrated) for determining the transmission speed is arranged on the transmission 60. Furthermore, speed sensors are arranged on at least two wheels for determining a vehicle speed of the vehicle 12. The further speed sensor on the transmission 60 can be used, for example, for controlling the tachometer.

Figure 2:
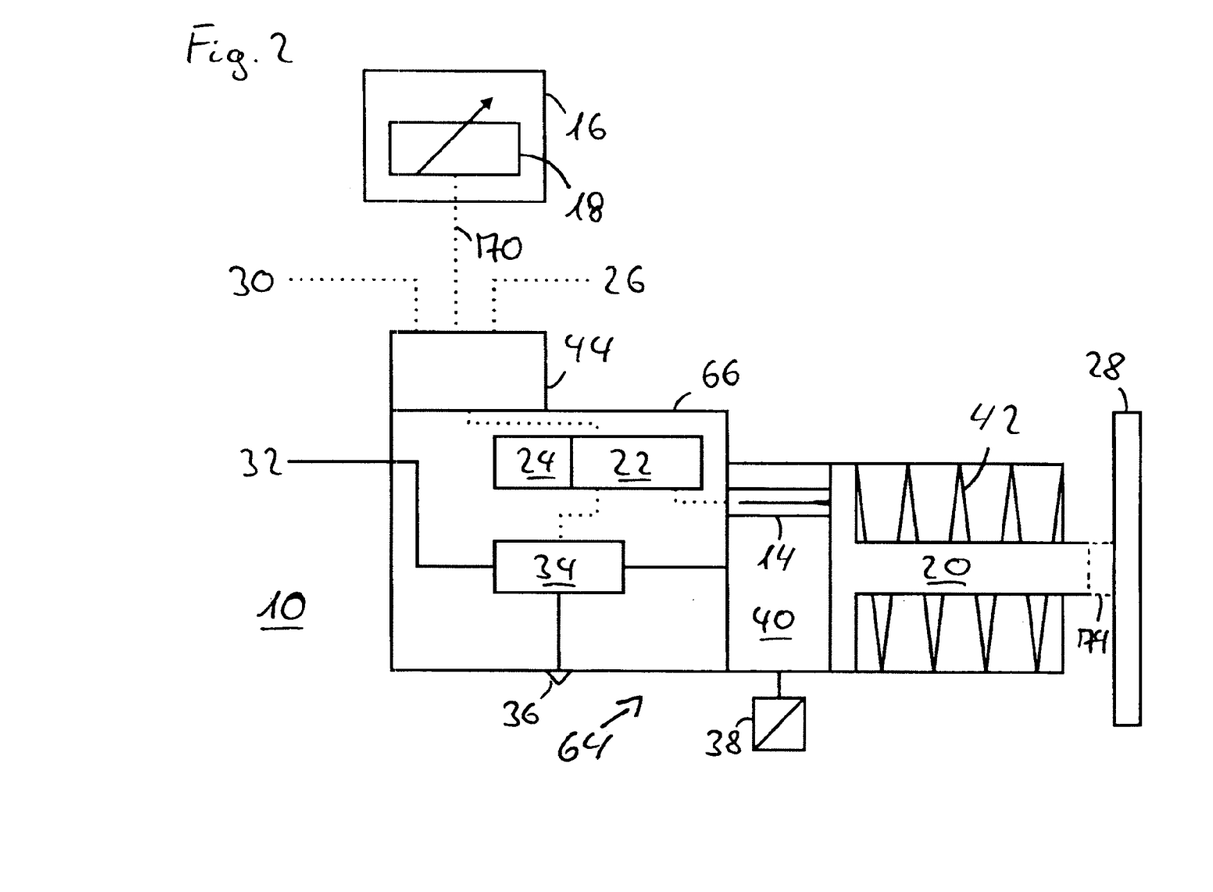
FIG. 2 is a schematic illustration of a clutch release system.

FIG. 2 shows a schematic illustration of a clutch release system. A clutch release system 10 as illustrated includes a clutch actuation device 16 with an integrated further sensor 18, which is coupled to a clutch release mechanism 64 via an electrical line 70. At an optional plug 44, via which the electrical line 70 is also guided, the clutch release mechanism 64 also has a connection for a voltage supply 30 and a connection 26 to a serial communication line, for example a CAN bus, which then leads to a control device 22.

At least one signal indicating the clutch wear is output via the connection 26, and the actuation travel of the clutch actuation device 16, for example a clutch pedal, can be determined via the electrical line 70, together with the further sensor 18. The message between the clutch actuation device 16 and the control device 22 can take place via a serial data protocol on the electrical line 70. If there is no plug 44 provided, the various connections 26, 30, 70 are guided separately into a housing 66 of the clutch release mechanism 64. Therefore, the control device 22 has a direct electrical link 70 to the clutch actuation device 16.

Furthermore, a media supply connection 32 and a media discharge line 36 are provided on the housing 66 of the clutch release mechanism 64, wherein a valve device 34 arranged in the housing 66 supplies or discharges, via the media supply connection or the media discharge line, medium used for operating the clutch release mechanism 64 to or away from a control area 40 of a release plunger 20.

The release plunger 20 is connected to a wearing part 28 via means for force transmission 74, for example a release bearing, a diaphragm spring and/or a pressure plate. The media discharge line 36 can, in particular when using compressed air as the medium, be in the form of simple deaeration, via which pressure can be let out into the surrounding environment. In this case, the solenoid valves arranged in the valve device 34 for driving the release plunger 20 are connected to a common deaeration bore for atmospheric deaeration.

The valve device 34 is driven via a control device 22, which is likewise arranged in the housing 66 and has a random-access memory 24 connected thereto, and can optionally be formed by a 3/2-port directional control valve or two 2/2-port directional control valves, which can be in the form of solenoid valves. In addition, a further 2/2-port directional control valve can also be arranged in the valve device, and this acts as a pressure maintenance valve. If the valve device 34 is in the form of a 3/2-port directional control valve, a first connection of the 3/2-port directional control valve is coupled to the media supply 32, a second connection is coupled to the media discharge line 36 and a third connection is coupled to the control area 40. The pressure maintenance valve can be arranged between the third connection of the 3/2-port directional control valve and the control area. The individual valves arranged in the valve device 34 can be driven either in pulse-width-modulated fashion or with proportional operation via the control device 22. Further valve arrangements in the valve device 34 are possible. Therefore, the control device 22 is furthermore coupled to the integrated random-access memory 24, a sensor 14, and the valve device 34 for controlling the release plunger 20, via electrical lines.

The clutch release mechanism 64 is characterized by a control device 22, which is implemented in the housing 66 of the clutch release mechanism 64 and drives the valve device 34 so as to aerate and deaerate the plunger chamber, acting as control area 40, in the power part. The control device 22 is furthermore suitable for calculating the slip of the clutch system 10 using a drive motor speed and a transmission input speed. In this case, the control device 22 can, in particular, calculate various comparisons between the drive motor speed and the transmission output speed. If a slip of the clutch system 10 is detected, i.e. a slip in the drivetrain of the vehicle, the control device 22 can output a corresponding signal via a connection 26. The path covered by the release plunger 20 is measured by a sensor 14 in the form of a position sensor, which usually has an inductive design. An optional pressure sensor 38 measures the pressure in the control area 40. The control device 22 furthermore has a CAN connection 26, via which the control device 22 receives a transmission shaft input or transmission shaft output speed and motor data, for example a motor torque and a motor speed, in the form of a signal. The information parameters for the signals of the diesel drive motor are in this case described by the standardized messages according to SAE J1939 EEC1 and EEC2.

The clutch release mechanism 64 transmits its own messages or error messages which are calculated by the control device 22 from the related CAN data and from the measured data of the clutch release system, in accordance with a standardized protocol, for example according to SAE J1939/71, via a serial electrical data line, which can be identical, for example, to the connection 26 to the CAN bus. Therefore, the clutch release mechanism 64 also generates and writes its own real time protocol, which contains errors which have occurred, in each case at least also a time stamp, a stamp with the distance traveled from another control device, for example the tachometer, and the error frequency. The integrated random-access memory 24 used in this process is preferably in the form of an EE-Prom or flash memory and stores the error data, in addition to the characteristic parameters and trigger values. Furthermore, further clutch or vehicle data are stored in the random-access memory 24, for example the clutch diameter, the release lever transmission ratio and motor and transmission data.

In response to a measured rotary slip between the crankshaft speed and a speed sensor arranged downstream of the driver disk, i.e. a speed difference between the clutch input and the clutch output when the clutch is engaged, the clutch release mechanism 64 optionally transmits an inquiry message to the drive motor, which may in particular be a diesel motor, which then reduces the torque generated for relieving the load on the clutch. In this way, it is still possible to drive to the next service shop even with a slipping clutch and the resultant reduced coupling torque. It is also contemplated for certain gears or gear groups to be blocked in order to reduce the torque of the clutch to be transmitted or for the driver to be provided with a visual indication on a display showing which gears in this situation would lead to clutch overload.

A further possibility of additional slip monitoring in the drivetrain is the absolute comparison of motor speed and wheel speed and the average vehicle speed calculated therefrom. The clutch release system 10 can learn the roulette assignment and can use this variable also to calculate the speed of the transmission and the transmission ratios thereof.

Furthermore, an electrical vehicle control system and vehicle monitoring system can learn to use the wear on the wheels qualitatively for calculating the absolute slip response. For a quantitative value, however, a motor speed and a transmission speed are required.

Optionally, the clutch actuation command can also arrive via the connection 26, the serial data line, from another control device, i.e. not the clutch pedal. In this case, it is advantageous if, for example, a partially electronic transmission is constructed. In addition, the clutch can be opened and closed in the event of a defective clutch pedal during service operation via a diagnostic signal.

The text which follows describes the operational principle of the clutch release system 10, with details being given concerning the wear adaptation and the characteristic function. The release plunger 20 moves a pressure plate toward or away in order to move a release bearing, which is a wearing part 28 in the form of a clutch disc and includes a lining and a driver disc. It is thus possible for the clutch to be separated from the clutch lining when the pressure plate is lifted. The release plunger 20 is reset by a spring 42 in the event of the load being relieved on the control area 40, i.e. during deaeration the release plunger 20 is moved back and the clutch is closed again by the set of springs, which is usually in the form of a diaphragm or a specially shaped plate spring. In this case, it is possible to distinguish between clutches which are pushed or pulled in order to open. In the case of a clutch which is pulled in order to open, which is usually the case, a coil core which has entered deep into a coil of the sensor 14 gives a measure of a high degree of wear on the clutch lining. In the case of a clutch which is pushed in order to open, a high degree of wear is associated with a coil core which has moved far out of the coil.

The pressure prevailing in the control area 40 can be determined via a pressure sensor 38, which can optionally be arranged inside or outside the housing 66 of the clutch release mechanism 64. The position of the release plunger 20 can be detected via the sensor 14, which is coupled to the control device 22. In this case, the sensor 14 is preferably in the form of an inductive sensor, whose measurement principle is based on an inductive plunger coil measurement, and is driven by an alternating signal. The control device 22 therefore also includes an interface circuit for the sensor 14, which generates at least a quartz-triggered or oscillator-triggered AC signal for the position sensor 14. That is to say that a precise, constant carrier frequency assignment, which can only be generated using an oscillator or a quartz which is arranged in a resonant circuit, is required for the measured position sensor output value. The coil core entering the coil is in this case fixed on the release plunger 20.

The media discharge line 36 is illustrated in FIG. 2 as a simple deaeration for discharging compressed air. However, it is also possible to use a return line instead of the illustrated deaeration if the control medium used for operating the clutch release mechanism 64 is a fluid hydraulic medium which is intended to circulate in a closed circuit. The control device 22 arranged in the housing 66 moves the deflection plunger 20 by switching the valve device 34 in accordance with the preset input of the coupling actuation device 16, wherein a characteristic function F stored in the random-access memory 24 is used to determine that position of the release plunger which is desired by the clutch actuation device 16.

The characteristic function F is stored in the random-access memory 24 in this case at least in the form of the necessary parameters, for example a pitch, a coupling point and a start point. It is contemplated also to store the start point of the characteristic curve for a wearing part which has not yet been worn in order to make future wear more easily detectable. The wear is measured using the sensor 14, which measures the absolute distance between the housing 66 and the release plunger 20 in the engaged state and can be output by the control device 22 in the form of an electrical signal via an electrical line, for example the connection 26. The slip response in the region of very severe wear is at the same time evaluated via a change in speed in association with a change in torque. These variables are also an indicator of undesired slip, which can be attributed to other errors in the clutch system. The other errors include fatigue of the clutch contact-pressure spring, jamming of the release bearing, an unfavorable change in the friction lining as a result of environmental influences, for example icing over of the lining or the lining becoming covered with motor/transmission oil as a result of sealing rings which are not sealtight.

The mode of operation of the wear adaptation of the clutch release mechanism 64 is explained below with reference to FIG. 3.

Figure 3:
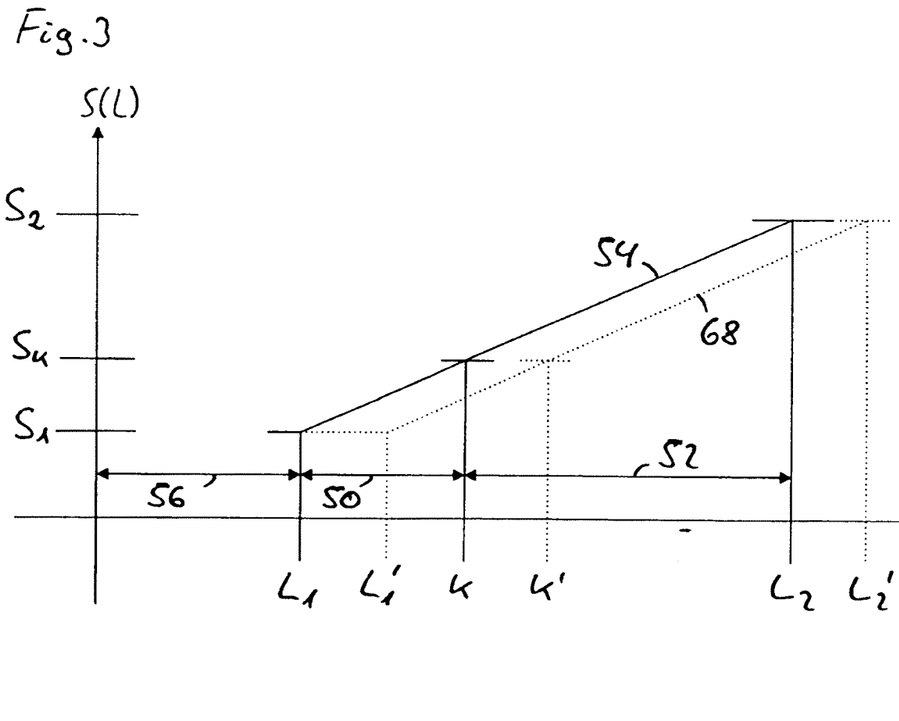
FIG. 3 is a characteristic function F and an updated characteristic function $F_{act}$.

FIG. 3 shows a characteristic function F and an updated, shifted characteristic function $F_{act}$. The distance through which the release plunger of the clutch release mechanism has been deflected out of its rest position is plotted on the X axis with L, and the position of the clutch actuation device detected by the further sensor starting from the rest position of the clutch actuation device is plotted on the Y axis with S(L). A characteristic function F 54 illustrated by a continuous line rises from point $(L_1, S_1)$ linearly to point $(L_2, S_2)$. As it rises, the characteristic function F 54 passes through a point $(K, S_k)$, at which the clutch disk moved by the clutch release mechanism enables a first force transmission in the drivetrain of the vehicle. The release of the release plunger between 0 and $L_1$ is referred to as a no-load excursion 56. The release between $L_t$ and K is referred to as wear 50 and the release between K and $L_2$ is referred to as disengagement stroke 52.

The wear adaptation regulation primarily consists in that the additional volume in the control area 40 which is caused by the wear and which is measured by the sensor 14 in the form of a greater distance, is aerated or traversed as quickly as possible. The actuator, the valve device 34, is therefore operated precisely in this region with a large pulse width. That is to say that the solenoid valves arranged in the valve device for the pressure buildup are driven in pulse-width-modulated fashion in such a way that their actuation time at the beginning of the release excursion is long and then decreases until the clutch lining is lifted off. The control loop used is closed via the position sensor 14, which is integrated in the housing 66 and which uses the matched setpoint variable of the clutch actuation device 16 as the preset input value.

In the case of different wear states of the wearing part in the form of a clutch disk, a coupling point $S_k$ which is as identical as possible is thus provided. A position of the clutch actuation device of less than $S_1$ cannot be detected or is not intended to be converted into a movement of the release plunger, for which reason this region can be referred to as a mechanical no-load excursion 56 of the clutch actuation device. The no-load excursion 56 can optionally be stored in the control device or preserves the value as a parameter, for example of the clutch actuation device. Therefore, the characteristic function F 54 begins at $(L_1, S_1)$ and the release plunger can remain at the beginning of the characteristic function in order to reduce the switching times if no preset input value is detected by the clutch actuation device. If the clutch actuation device is deflected further, starting from $S_1$, the release plunger is moved through a corresponding distance, for example through $K-L_1$ in the event of a deflection of the clutch actuation device through $S_k-S_1$.

As the number of switching operations of the clutch release increases, increasing wear on the clutch disk moved by the clutch release mechanism occurs, which would normally cause a shifted coupling point K, since a force-fitting connection is achieved by the clutch only in the event of a relatively large release of the release plunger. Furthermore, the response time of the clutch is overall greater since the release plunger needs to cover a greater distance for closing the clutch. In order to compensate for this, the beginning of the characteristic function F 54 is shifted towards the right to give an updated characteristic function $F_{act}$ 68, which can be determined via the clutch slip of the clutch disk, wherein the new start point $(L_1', S_1)$ of the updated characteristic function $F_{act}$ 68 is dependent on the wear on the clutch disk moved by the clutch release mechanism. The updated characteristic function $F_{act}$ 68 is shifted with respect to the characteristic function F 54 through the distance $L_1'-L_1$ in the positive X direction. The distance through which the updated characteristic function $F_{act}$ 68 has been shifted with respect to the characteristic function F 54 in this case corresponds to the material thickness eroded by wear on the clutch lining of the clutch disk. By the characteristic function F 54 being shifted in the positive X direction, the driver of the vehicle is provided with the subjective impression of a constant coupling point K since the force transmission still takes place at $S_k$. Furthermore, the shifting time of the clutch remains constant. However, the adaptation of the associated position of the release plunger from point K to point K' is not perceived and automatically achieved by the characteristic function F.

The characteristic function F can be determined from the position of the release plunger in relation to the position of the clutch actuation device, wherein the coupling point K can be determined via the CAN bus depending on a motor speed of the drive motor, a speed at the transmission output and the motor torque by the clutch slip. In the simplest case, the motor speed is not equal to zero and the speed at the transmission output is equal to zero. This state corresponds to an open clutch. If the motor speed is equal to the speed at the transmission output downstream of the clutch, wherein the transmission ratio of the transmission needs to be taken into consideration, the clutch is closed. The motor torque is significant when taking into consideration a clutch slip which is possible in the region of the coupling point K.

Figure 4:
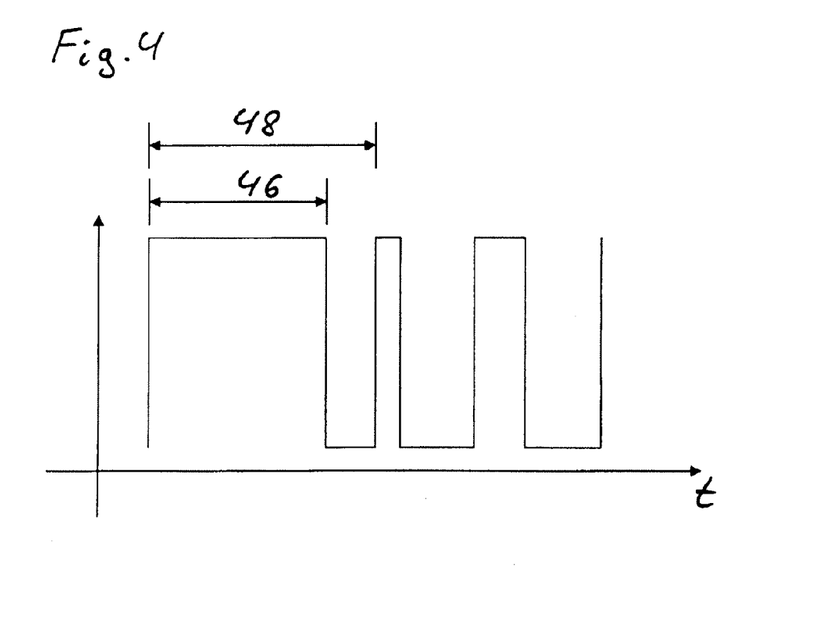
FIG. 4 is a graph for illustrating pulse-width-modulated driving of a valve device of the clutch release system.

FIG. 4 is a graph illustrating pulse-width-modulated driving of a valve device of the clutch release mechanism. The time is plotted on the X axis and the driver pulse for the driven valve device is plotted on the Y axis. The driver pulse illustrated has a pulse width 46 with a tolerance 48 of approximately plus/minus 40%. The pulse width 48 is matched to the position of the clutch actuation device and is, inter alia, a function of a no-load distance correction, a wear distance correction of the distance already covered by the release plunger and the spring resetting the release plunger.

Figure 5:
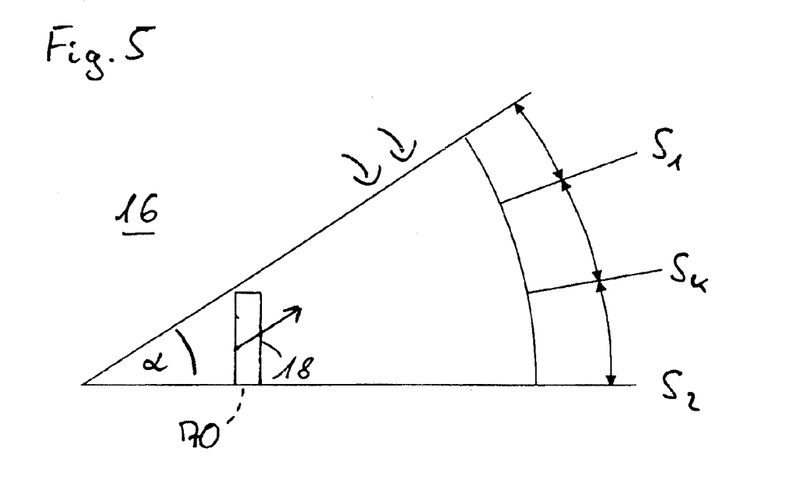
FIG. 5 is a schematic illustration of a clutch actuation device with various actuation states.

FIG. 5 is a schematic illustration of a clutch actuation device with different actuation states. The clutch actuation device 16 illustrated comprises a further sensor 18, which is connected to an electrical line 70, for detecting the position of the clutch actuation device 16. The clutch actuation device 16 illustrated is in the form of a pedal which can be actuated along a curve in the form of segments of a circle, wherein the marked axis can be pivoted through an angle α with respect to the stationary axis. In the completely actuated state, the further sensor 18 detects the position $S_2$ of the clutch actuation device 16. The smallest possible deflection from the rest position of the clutch actuation device 16 which can be detected by the further sensor 18 corresponds to the illustrated position $S_1$. Alternatively, it is also possible for the further sensor 18 to be able to detect all of the positions of the clutch actuation device between the rest position and the maximum deflection $S_2$, but all of the positions less than $S_1$ should not be converted in the form of a movement of the release plunger. The rest position of the clutch actuation device 16 is illustrated on that side of the position $S_1$ which is remote from position $S_2$. The position $S_k$, at which the clutch produces a first force-fitting connection, is illustrated between the two maximum detectable positions of the clutch actuation device.

TABLE OR REFERENCE NUMERALS

- 10 Clutch release system
- 12 Vehicle
- 14 Sensor
- 16 Clutch actuation device
- 18 Further sensor
- 20 Release plunger
- 22 Control device
- 24 Random-access memory
- 26 Connection
- 28 Wearing part
- 30 Voltage supply
- 32 Media supply connection
- 34 Valve device
- 36 Media discharge line
- 38 Pressure sensor
- 40 Control area
- 42 Spring
- 44 Plug
- 46 Pulse width
- 48 Tolerance
- 50 Wear
- 52 Deflecting excursion
- 54 Characteristic function F
- 56 No-load excursion
- 58 Drive motor
- 60 Transmission
- 62 Drive shaft
- 64 Clutch release mechanism
- 66 Housing
- 68 Updated characteristic function $F_{act}$
- 70 Electrical line
- 72 Clutch
- 74 Means for force transmission The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method of operating a clutch release system of a vehicle having an electrically actuable clutch release mechanism with a first sensor for detecting a position of a release plunger of the clutch release mechanism, a second sensor for detecting a position of a clutch actuating device and a control device controlling the release plunger as a function of a detected position of the clutch actuation device, the method comprising the acts of:

storing a characteristic function describing a relationship between the position of the clutch actuation device and the position of the release plunger in a random-access memory arranged in the clutch release system;

detecting the position of the clutch actuation device and of the release plunger for a defined position of the clutch actuation device;

actuating the clutch release system to achieve a constant clutch release notwithstanding wear of the clutch release system by factoring the characteristic function;

during actuation of the clutch release system, determining by the control device an updated characteristic function, the updated characteristic function describing an actual relationship between the position of the clutch actuation device and the position of the release plunger, wherein the updated characteristic function is shifted with respect to the characteristic function through a distance that corresponds to a material thickness eroded by wear on a clutch lining of a clutch disk, wherein a point on the characteristic function is determined at which the clutch disk moved by the clutch release system enables a first force transmission; and replacing the stored characteristic function with the updated characteristic function after the actuation of the clutch release system in order to provide an actual characteristic function during a next actuation of the clutch release system.

2. The method according to claim 1, further comprising the act of:

for determining the characteristic function, factoring into account a clutch slip during the actuation of the clutch release system.

3. The method according to claim 1, further comprising the act of:

issuing a warning signal if a stored permissible wear value exceeds a determined wear value.

4. The method according to claim 1, wherein the storing act occurs prior to a first actuation of the clutch release system.

5. The method according to claim 1, wherein the stored characteristic function is determined during a first actuation of the clutch release system and is stored in the random-access memory.

6. A clutch release system, comprising:

an electrically actuable clutch release mechanism, the clutch release mechanism comprising:
    a release plunger;
    a first sensor for detecting a position of the release plunger;
    a control device for controlling the release plunger as a function of a detected position of a clutch actuation device;
    a second sensor for detecting a position of the clutch actuation device;
    wherein the control device is operatively configured to factor a characteristic function describing an actual relationship between the position of the clutch actuation device and the position of the release plunger into consideration in the case of a defined position of the clutch actuation device in actuating the clutch release system to achieve a constant clutch release notwithstanding wear of the clutch release system, the characteristic function describing a relationship between a position of the clutch actuation device and a position of the release plunger, wherein the control device is operatively configured for determining, during the actuation of the clutch release system, an updated characteristic function, wherein the updated characteristic function is shifted with respect to the characteristic function through a distance that corresponds to a material thickness eroded by a wear on the clutch lining of a clutch disk, wherein a point on the characteristic function is determined at which a clutch disk moved by the clutch release system enables a first force transmission; and the control device is further operatively configured to replace the stored characteristic function with the updated characteristic function after actuation of the clutch release system to provide an actual characteristic function during a next actuation of the clutch release system.

7. The clutch release system according to claim 6, further comprising a connection for connecting the clutch release system to a CAN bus.

8. The clutch release system according to claim 6, further comprising a connection for connecting the clutch release system to a CAN bus.

9. The clutch release system according to claim 6, wherein the control device is further operatively configured to determine the characteristic function during a first actuation of the clutch release system and for storing the characteristic function in a random-access memory of the clutch release system.

* * * * *